United States Patent [19]

Adams

[11] Patent Number: 4,470,217

[45] Date of Patent: Sep. 11, 1984

[54] FISH HOOK

[76] Inventor: Nicholas S. Adams, Rte. 10, Box 164, Brainerd, Minn. 56401

[21] Appl. No.: 432,184

[22] Filed: Oct. 1, 1982

[51] Int. Cl.³ .............................................. A01K 83/00
[52] U.S. Cl. ................................................... 43/44.8
[58] Field of Search .................. 43/43.16, 44.8, 44.82; 24/230.5 AD, 230.5 W, 217 W, 228, 141

[56] References Cited

U.S. PATENT DOCUMENTS

| | | | |
|---|---|---|---|
| 2,733,540 | 2/1956 | Harding | 43/44.82 |
| 2,922,247 | 1/1960 | Buss | 43/44.82 |
| 3,243,835 | 4/1966 | Armentrout | 24/141 |
| 3,248,373 | 4/1966 | Barringer | 24/141 |
| 3,331,151 | 7/1967 | Turrentine | 43/44.82 |
| 3,864,863 | 2/1975 | Neal | 43/42.25 |
| 4,165,578 | 8/1979 | Klein | 43/44.8 |

*Primary Examiner*—Nicholas P. Godici
*Assistant Examiner*—Marc Hodak
*Attorney, Agent, or Firm*—Dorsey & Whitney

[57] ABSTRACT

A fish hook adapted for use as a trailer hook including a shank portion, a hook portion, an eyelet portion and a coating material covering the eyelet portion and spanning the eyelet opening. The coating material is sufficiently soft to permit the hook to pierce and extend through that portion of the coating material spanning the eyelet opening and sufficiently elastic to prevent the fish hook from being inadvertently removed from the primary hook to which it is connected.

7 Claims, 6 Drawing Figures

U.S. Patent   Sep. 11, 1984   4,470,217
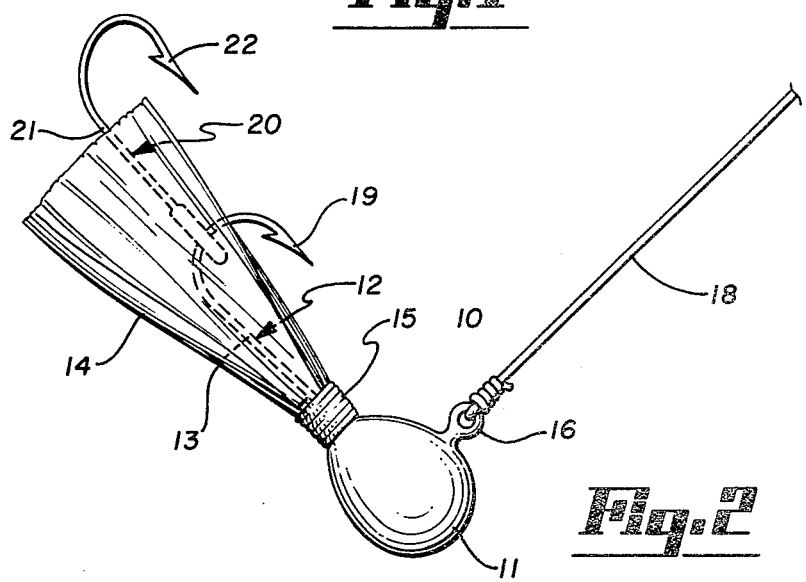
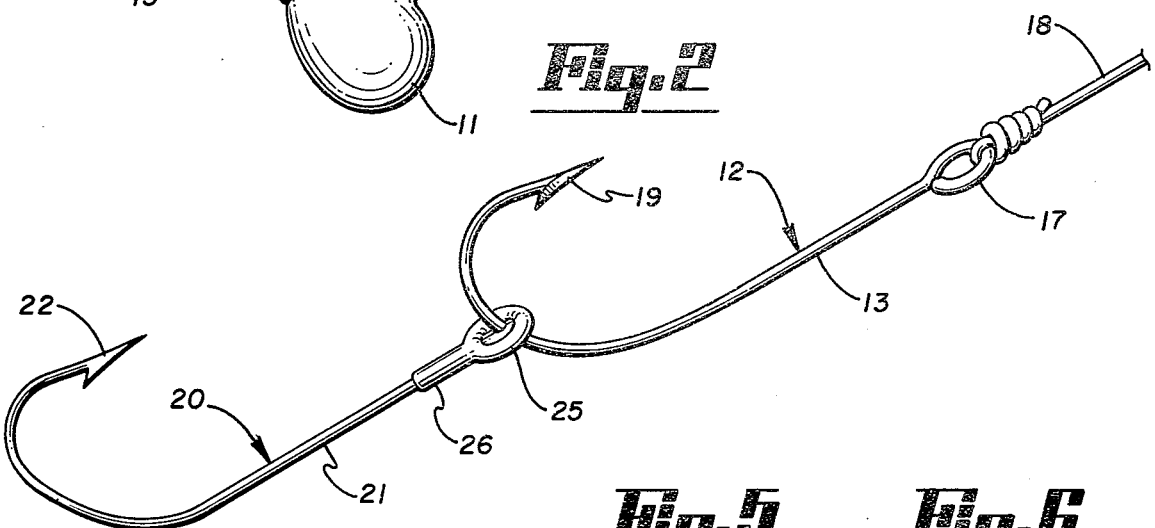
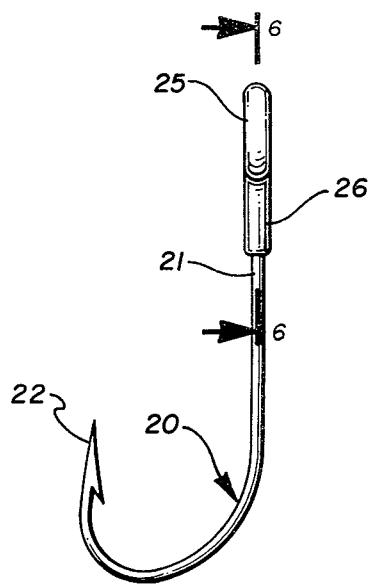 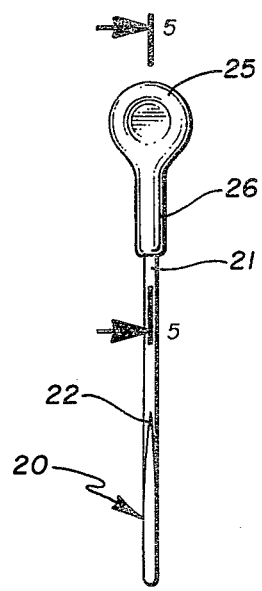 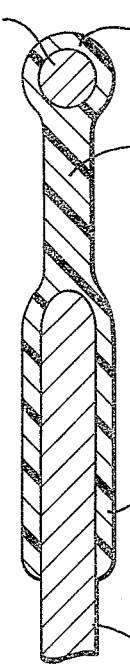 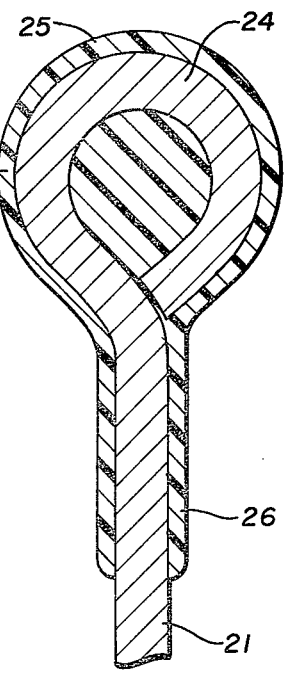

FISH HOOK

BACKGROUND OF THE INVENTION

The present invention relates generally to the field of fishing hooks and more particularly to a fishing hook adapted for utilization as a trailer or stinger hook.

It is known that fish will often strike short when striking at a baited hook or other fishing lure. In other words, the fish will often strike toward the rearward or trailing end of the baited hook or fishing lure rather than at its leading end. As a result, the fish is often missed because the hook portion does not extend completely to the rearward end of the lure or the bait. To counteract this tendency of fish to strike short and thus in many cases miss the hook portion of the lure, fishermen will often use what is known as a trailer or stinger hook. A trailer hook is simply a second hook whose eyelet portion has been slipped over the hook end of the primary or bait hook. By doing this, the hook portion of the trailer hook is disposed near the rearward end of the lure to provide the fisherman with a better chance of catching the fish which strikes short. A stinger hook serves a similar purpose except that it is connected directly to the shank portion of the primary hook by wrapping or the like.

Presently, fishermen use conventional fish hooks as trailer hooks by slipping the eyelet portion of such hook over the hook end of the primary or bait hook. To prevent this trailer hook from inadvertently slipping off the primary hook during casting or when a strike occurs, a short plastic tubular element referred to as a keeper is slipped onto the primary hook after the trailer hook. The keeper is precluded from removal from the primary hook by the primary hook barb. This in turn prevents the trailer hook from inadvertently slipping off the primary hook. One of the disadvantages of the above described prior system is that a keeper can only be used once since each time it is slipped over the barbed end of the primary hook, it cannot be removed without destroying the same. Secondly, the trailer hook which is mounted onto the primary hook in this manner, is allowed to hang free with respect to the primary or bait hook; thus, there is no way to align the primary and trailer hooks. Such a feature is highly desirable. Accordingly, there is a need in the art for an improved fish hook adapted for use as a trailer hook which overcomes the above-mentioned deficiencies.

SUMMARY OF THE INVENTION

The present invention relates to an improved fishing hook which is adapted for utilization as a trailer or stinger hook. The hook of the present invention has several advantages over presently existing trailer hook systems. First, it does not require a keeper or other similar means to retain the trailer hook with respect to the primary hook and prevent the same from inadvertently slipping off. Secondly, the improved hook of the present invention can be reused many times and still function satisfactorily as a trailer hook to prevent the same from inadvertently slipping off the primary hook. Thirdly, the improved hook of the present invention has means for retaining the trailer hook in a relatively fixed position with respect to the primary hook. This permits the fisherman to adjust the alignment between the primary and trailer hooks.

The improved fish hook of the present invention comprises a conventional hook whose eyelet end has been coated with a rubber or plastic type material so that the eyelet end is completely closed. With this structure, the hook portion of the primary hook can be inserted through the coating material which covers the eyelet portion of the trailing hook. This causes the hook portion of the primary hook to pierce and separate a portion of the rubber or plastic material and permit the trailing hook to be slipped onto the bait hook. Because of the elastic and other characteristics of the coating material, the material within the eyelet portion of the trailer hook presses against the bait hook with enough force to allow the position of the trailer hook to be reasonably affixed relative to the primary hook. Also, because the rubber or plastic type material is merely separated and not broken down or destroyed upon insertion of the hook portion of the primary hook, the coating material will prevent the trailer hook from being inadvertently removed from the primary hook as a result of engagement with the primary hook barb.

Accordingly, it is an object of the present invention to provide an improved fishing hook adapted for utilization as a trailer or stinger hook.

Another object of the present invention is to provide an improved trailer hook which does not require use of a keeper to retain the same with respect to the primary hook.

Another object of the present invention is to provide an improved trailer hook which can be reused several times and still maintain the desirable properties of a trailer hook.

A further object of the present invention is to provide an improved trailer hook with means permitting the fisherman to fix the position of the trailer hook relative to the primary hook.

These and other objects of the present invention will become apparent with reference to the drawings, the description of the preferred embodiment and the appended claims.

DESCRIPTION OF THE DRAWINGS

FIG. 1 is a pictorial view of a conventional fishing jig with the improved trailer hook of the present invention connected therewith.

FIG. 2 is a pictorial view of a trailer hook embodying the features of the present invention connected with a primary or bait hook.

FIG. 3 is a side elevational view of the improved trailer hook of the present invention.

FIG. 4 is a front elevational view of the improved trailer hook of the present invention.

FIG. 5 is a cross-sectional view of the improved trailer hook of the present invention as viewed along the section line 5—5 of FIG. 4.

FIG. 6 is a cross-sectional view of the improved trailer hook of the present invention as viewed along the section line 6—6 of FIG. 3.

DESCRIPTION OF THE PREFERRED EMBODIMENT

In the drawings, FIGS. 1 and 2 are general, pictorial views showing the improved trailer hook 20 of the present invention connected with a primary or bait hook 12, while FIGS. 3-6 show specific details of the trailer hook 20. As illustrated in FIG. 1, the improved trailer hook 20 of the present invention is shown as connected to a primary or bait hook 12 which forms part of the jig 10. The jig 10 includes a weighted head portion 11 and an eyelet 16 extending from the weighted head portion 11. A fishing line 18 is intended for attachment to the eyelet 16. Extending rearwardly from the weighted head portion 11 is the primary or bait hook 12 which comprises a shank portion 13 and a hook portion 19. The jig 10 also includes a plurality of feathers, hair or other lure material which is secured with respect to the weighted head portion 11 by the wrapping threads 15. As shown in FIG. 1, the trailer or stinger hook 20 is slipped over the hook portion 19 of the primary hook 12.

As illustrated in FIGS. 3–6, the trailer hook 20 includes a shank portion 21 with first and second ends, a hook portion 22 connected with the first end and an eyelet portion 24 having an eyelet opening extending therethrough connected with the second end. The hook 20 also includes a coating material which has been applied to the eyelet end 24. As illustrated best in FIGS. 5 and 6, the coating material identified by reference numerals 25 and 26 covers the eyelet portion 24 and an upper portion of the shank 21. Although the preferred structure shows the coating material as covering both the eyelet portion 24 and the upper end of the shank 21, the coating material 26 which covers a portion of the shank is not needed for an acceptable trailer hook according to the present invention.

In the preferred embodiment, the coating material 25 and 26 is applied to the eyelet end 24 by dipping the end 24 into a container of the coating material which is in liquid form. The hooks are then withdrawn from the material and allowed to harden and cure to the desired end material. While there may be other ways to coat the eyelet ends of the hook with the coating material, the dipping procedure is preferred. In the preferred structure of the present invention, the material which forms the coating portions 25 and 26 is a rubber or plastic type material which, upon dipping the end of the hook in a liquid bath of the material will coat the eyelet end of the hook and extend completely across or span the eyelet opening as illustrated best in FIGS. 4, 5 and 6. It is also preferable that this coating material comprising the portions 25 and 26 be sufficiently soft to permit the hook end 19 of the primary hook to pierce and extend through the coating material spanning the eyelet opening and sufficiently elastic to prevent the hook 20 from being inadvertently removed from the primary hook 12. With these properties, the hook portion 19 of the primary hook 12 (FIG. 2) can be inserted through the coating material 25 extending across the eyelet opening of the trailing hook 20. During this insertion, the material is split apart and because of its elasticity continues to exert a frictional force against the outer sides of the primary hook 12.

As illustrated best in FIG. 2, a trailer hook 20 embodying the features of the present invention has been connected with a primary hook 12 by inserting the hook portion 19 of the primary hook 12 through the coating material 25 extending across the eyelet opening of the trailer hook 20. When this is done, the material 25 is merely separated, but not broken down or destroyed. Thus, because of the generally resilient and elastic characteristics of the coating material, it continues to exert a frictional force against the sides of the primary hook 12, thus permitting the fisherman to adjust the position of the trailer hook 20 with respect to the primry hook 12. This prevents the trailer hook 20 from hanging free with respect to the primary hook 12. Also, because of the generally elastic characteristics of the coating material forming the portion 25, inadvertent removal of the trailer hook 20 from the primary hook 12 is prevented by the barb of the hook portion 19. It is relatively easy, however, to manually remove the trailer hook 20 from the primary hook 12 by aligning the barb of the hook portion 19 with the slot which has been cut into the portion 25 upon insertion and then exerting sufficient force to remove the trailer hook 20 from the primary hook 12. It has been found that a trailer hook 20 embodying the features of the present invention can be removed from the primary hook 12 and reinserted for use as a trailer hook many times and still retain the characteristics which prevent it from being inadvertently slipped from the primary hook and which also enables it to be reasonably fixed with respect to the primary hook.

It is contemplated that a variety of materials will function satisfactorily as the coating material. The preferred material is a synthetic, air dry elastomer which is maintained in liquid form prior to use by an elastomeric solvent. Upon dipping of the eyelet end 24 into this material, the material is air dried, thus permitting evaporation of the elastomeric solvent and curing or hardening of the material on the hook. In the preferred embodiment, an acceptable coating material is an elastomeric, air dry block copolymer material manufactured by PDI Incorporated of St. Paul, Minn. and sold under the trademark PLASTIC DIP.

Although the description of the preferred invention has been quite specific, it is contemplated that various changes could be made to the preferred structure without deviating from the spirit of the present invention. Accordingly, it is contemplated that the scope of the present invention be dictated by the appended claims rather than by the description of the preferred embodiment.

I claim:

1. A fish hook having use as a trailer hook and adapted for connection with a primary hook, said fish hook comprising:
   a shank portion having first and second ends;
   a hook porton connected with the first end of said shank portion;
   an eyelet portion having an eyelet opening therein and being connected with the second end of said shank portion; and
   a coating material extending completely around and coating said eyelet portion so that said coating material spans the entire eyelet opening, said coating material being sufficiently soft to permit the hook portion of the primary hook to pierce and extend through that portion of said coating material spanning said eyelet opening and being sufficiently elastic to prevent the fish hook from being inadvertently removed from the primary hook.

2. The fish hook of claim 1 wherein said coating material is a synthetic material.

3. The fish hook of claim 2 wherein said coating material is applied by dipping said eyelet portion in a liquid bath of said coating material.

4. The fish hook of claim 1 wherein said coating material has sufficient elasticity to retain the fish hook in a desired position relative to the primary hook.

5. The fish hook of claim 1 wherein said coating material is a block copolymer.

6. The fish hook of claim 1 wherein said coating material is an elastomer.

7. The fish hook of claim 6 wherein said coating material is an air dry elastomer.

* * * * *